June 19, 1945.  M. WATTER  2,378,885
EMPENNAGE CONSTRUCTION AND MOUNTING
Filed March 6, 1943  2 Sheets-Sheet 1
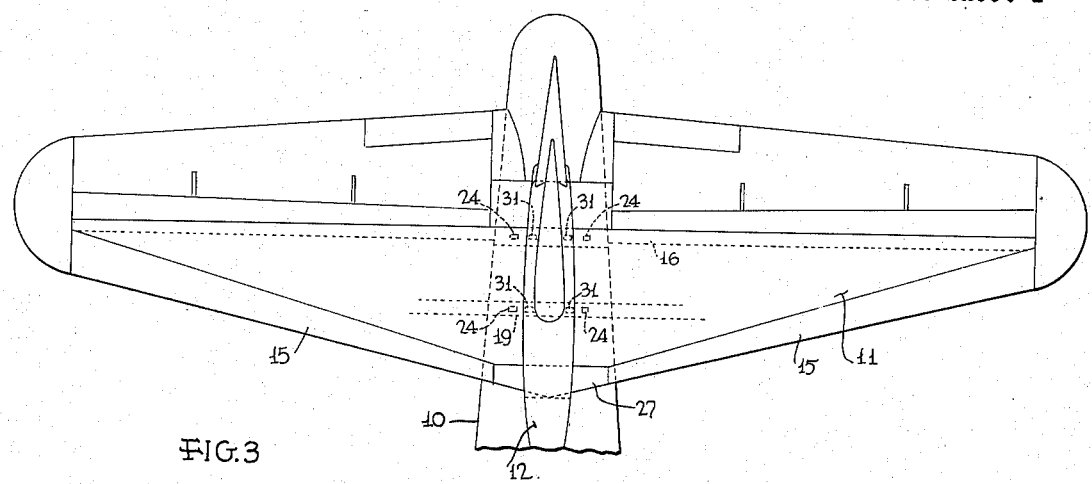
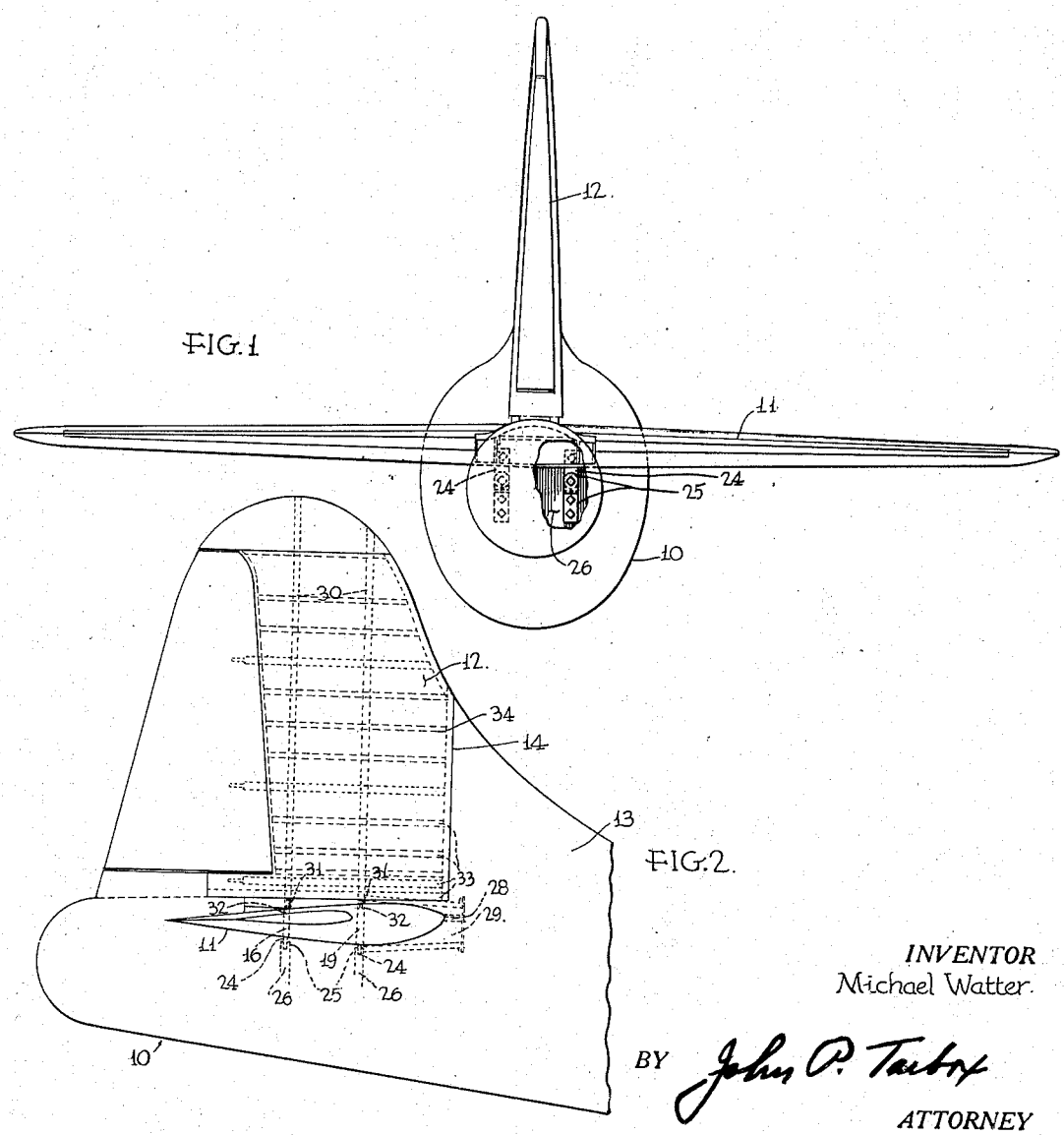
INVENTOR
Michael Watter.
BY John P. Tarbox
ATTORNEY

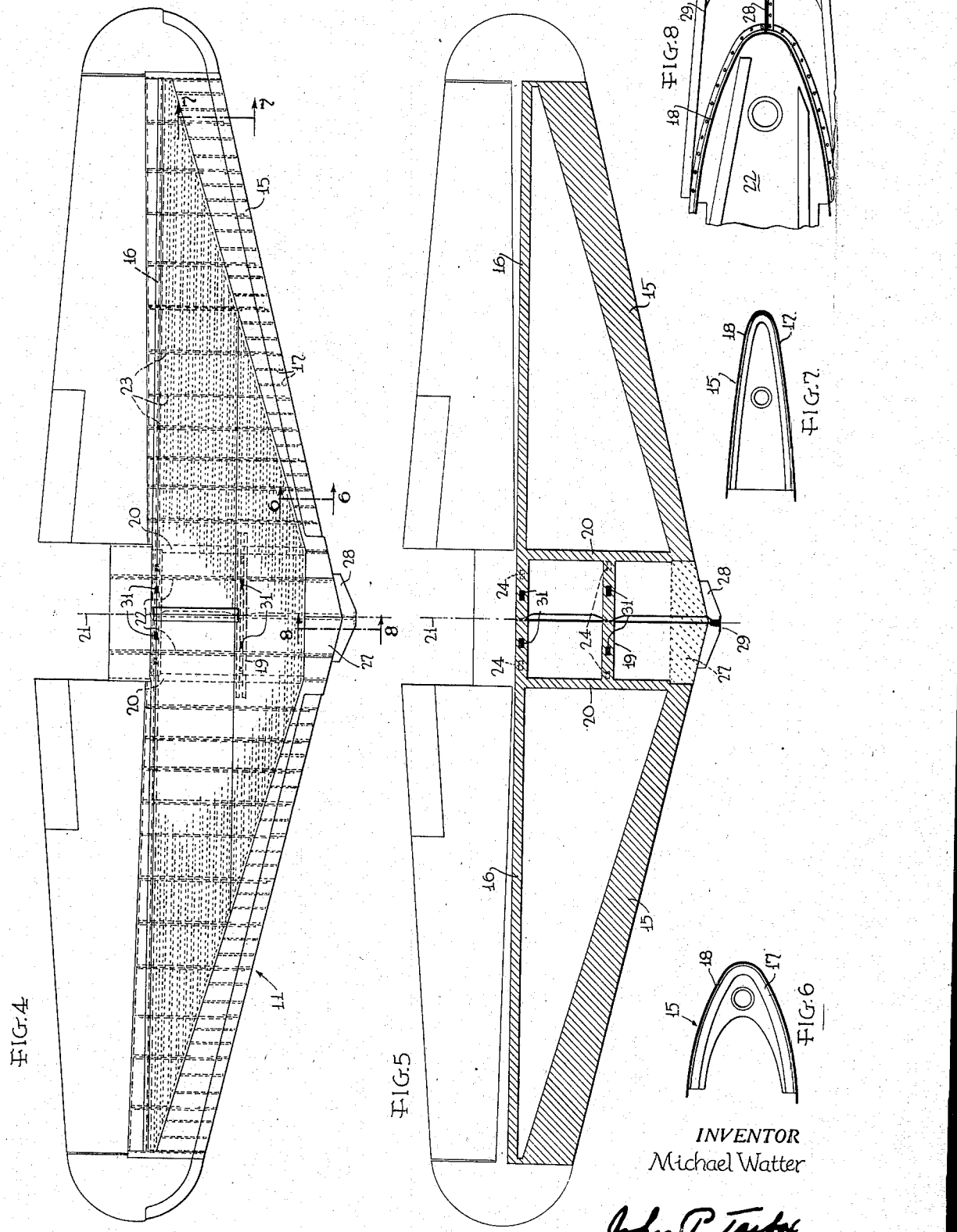

Patented June 19, 1945

2,378,885

UNITED STATES PATENT OFFICE 2,378,885

EMPENNAGE CONSTRUCTION AND MOUNTING

Michael Watter, Philadelphia, Pa., assignor to Edward G. Budd Manufacturing Company, Philadelphia, Pa., a corporation of Pennsylvania Application March 6, 1943, Serial No. 478,227

10 Claims. (Cl. 244—117)

This invention has to do with empennage construction and mounting for aircraft, particularly for airplanes, although it may have some applicability to lighter than aircraft of construction adapted to its use.

The primary objects of the construction and mounting are the lightening up of the construction at large, saving of very considerable weight, and a marked improvement in the ruggedness, permanence and security of mounting. Secondary objects include a combining of the structures of the vertical and horizontal stabilizers of an empennage in such a manner that construction of the one not only enhances the ruggedness, permanency and security of anchorage of the other, but also that they structurally reinforce each other to the end of yet further reduction in weight. Tertiary advantages have to do with reduction in cost of manufacture and assembly.

It has been a notable fact in aircraft construction that less attention has been paid to the improvement of the lesser surfaces than has been paid to the improvement of the greater surfaces in their structural organization and anchorage. This has resulted often in the incorporation of undue weight in the lesser airfoil surfaces of an aircraft. Spars and stringers have been unduly lengthened and members have been given undue cross-sections because old-time structural organizations and anchorages have been adhered to. Augmenting this situation is the fact that the conditions surrounding the anchorage of lesser surfaces such as those of the empennage are notably different from the conditions surrounding the anchorage of the main surfaces of great size to the body of an aircraft. It is the aim of this invention to overcome these obstructions to progress in empennage improvement.

The aim and objects of the invention are attained outstandingly through the utilization in conjunction with a main spar or spars of a stabilizing surface or airfoil, of a false spar removed longitudinally of the body of the craft a distance from the main spar, providing each the main spar and the false spar with a body-overlying portion, terminating the false spar not far removed from the body while maintaining the length of the main spar substantially that of the stabilizing surface, interconnecting the outer portion of the false spar and the inner portion of the main spar by a shear rib extending transversely of the surface, which shear rib or equivalent structure is adapted to transmit in shear the stresses of the main spar into the false spar, and providing a rigid anchorage of the body-overlying portion of the false spar to the body, the while permitting relative deflection of the body-overlying portion of the main spar with respect to the body.

The combination of two such stabilizing surfaces, a vertical and a horizontal for example, to produce the two principal components of an empennage construction is effected by anchoring the one such stabilizing surface to the other through that same false spar structure by means of which anchorage of the first such stabilizing surface is effected with the body.

In the accompanying drawings there is illustrated one embodiment of the invention, but it will be quite obvious upon an understanding of the one that there are a number of others quite within the generic spirit.

Of these drawings:

Figure 1 is an end elevation of such an empennage;

Figure 2 is a side elevation thereof;

Figure 3 is a top plan view thereof;

Figure 4 is a top plan view showing an enlargement of the horizontal stabilizer of this illustrated empennage delineating in full and dotted lines the main and false spars and showing in enlarged way the anchorages to the body;

Figure 5 is a diagram in plan similar to that of Figure 4 showing the main and false spars and shear ribs in that relation of mechanises which they bear to each other, in order to afford an easily comprehensible picture of the manner of transmission of the stresses from the spars through the anchorages to the body of the aircraft;

Figures 6, 7 and 8 are cross-sections on lines of corresponding numbers of Figure 4 delineating the relative sizes of cross-sections of the front spar as comprised by the leading edge of the horizontal stabilizer.

Now in detail, the body or fuselage of the aircraft is designated 10. The tail portion entering the empennage construction is the only portion shown. The horizontal stabilizer is designated 11, while the vertical stabilizer is designated 12. The element 13 is a vertical dorsal fin which does not enter into the construction and anchorage of the present invention to a large degree, though it may in other embodiments enter so into it. In this construction the main area of the fin is separated from the vertical stabilizer 12 by a joint 14 lying forwardly.

This joint might be yet further forward and, if so, the fin would enter to greater degree.

The horizontal stabilizer, as clearly appears especially in Figures 3 to 6, is comprised of front and rear main spars 15 and 16. These main front and rear spars are through-running, extending transversely of the aircraft substantially from tip to tip of the horizontal stabilizer 11. The front spar is C-shaped in section as shown in Figures 6 to 8 inclusive, being composed of metal nose ribs 17 and overlying metal skin 18 secured thereto. The great strength of spars so comprised of the leading edges or nose portions of wings is well known in the art. The C-section of this front spar 15 varies in width, being narrow in the central portion of the stabilizer where the airfoil section is deep and considerably wider near the tips of the stabilizer where the airfoil section is shallow. In its extreme central portion it is somewhat deeper than in the inner central portion, but in any event the spar is continuous substantially from tip to tip of the stabilizer.

The rear spar 16 which appears only in dotted lines may be of any type of construction but is preferably of some form of truss. Inasmuch as the form of the spar does not enter into the invention herein-defined, it is not necessary to illustrate it for any form will do. While the front spar is angular in form, being rearwardly divergent as are the leading edges of the stabilizer, the rear spar is substantially rectilinear in form.

Intermediate the front and rear spars and longitudinally removed from each is a false spar 19 relatively short, in its main body portion overlying the body 10 of the aircraft as indeed do the main spars in their central portions, and terminating not a great distance beyond that portion of the body which it overlies. It, too, may be of any desired construction.

This false spar 19 is rigidly connected with both front and rear main spars 15 and 16 by relatively heavy shear ribs 20. These shear ribs interconnect the outer portions of the short false spar 19 with the inner or body adjacent portions of the main spars 15 and 16. These shear ribs are adapted to transmit stresses from the main spars to the short false spar 19. Intermediate the shear ribs 20 and upon the center line 21 of the structure are yet other ribs 22 also capable of transmitting stresses in shear and of greater or less strength than the relatively heavy ribs 20. However, it is preferred that the ribs 20 be heavy and those 22 be somewhat lighter.

Intermediate the spars 15 and 16 outwardly of the region of the shear ribs 20, 22 is a series of ordinary ribs 23 such as found generally in airfoil structures, and the function of which is to interconnect the spars, to bear stringers and to support those skins which complete the airfoil structure.

Projecting downwardly from each rear spar 16 and the false spar 19 are anchoring lugs 24. These anchoring lugs have their main bodies connected rigidly with the spar structures in any known manner and their downwardly projecting lower ends project freely for attachment to complemental members 25 carried by the body (see Figures 1 and 2). Members 24 and 25 are connected together by bolting. Members 25 may be rigidly connected to any appropriate rigid part of the body 10, but by way of illustration are shown as connected to diaphragms 26 of the body by bolts. This affords rigid connection of the relatively rigid system comprised of front and rear spars 15 and 16, shear ribs 20 and false spar 19 directly into the body 10.

However, the central portion 27 of the front spar 15, integral though it is with the laterally extending portions, is not over its extended length rigidly connected with the body either directly or indirectly. This central portion is provided with two connections, one a forwardly projecting flat plate 28 borne by the central portion 27 and having its front edges secured to the body 10, and the other a forwardly projected vertically extending flat plate 29 also borne by the central portion 27. The horizontal plate 28 secured by vertical bolts is, as respects the rigid structure 15, 16, 19, 20, 22, 24, 25, relatively flexible, whereby the stresses as indicated by the full-line shading in the diagram of Figure 5 are substantially wholly transmitted to the body by way of the relatively rigid structure recited, those in the front main spars 15 by way of the shear ribs 20, the false spar 19 and its lugs 24 into the body. The vertical plate connections 29 secured to the stabilizer 11 and also secured at its front end to the body 10 in the vertical plane thereof afford a fulcruming connection for the front spar 15 such that through its reaction it assists in directing stresses along the shaded areas of the rigid structure into the body by way of the false spar 19.

Surmounting the horizontal surface is the surface of the vertical stabilizer 12 as heretofore recited. This surface embodies two vertical spars 30, the lower ends of which are anchored respectively to the false spar 19 and the rear spar 16 by means of lugs 31, 32 built respectively into the structures of the spars 19, 16 and the spars 30. The lugs 31, 32 are, like lugs 24, 25, bolted together rigidly. Thus, the vertical stabilizer surface 12 of the empennage structure becomes anchored to the body 10 through the same rigid system as is the horizontal stabilizing surface 11. Through a system of shear ribs 33 rigidly connecting spars 30, the stresses on the forward portion 34 of this vertical surface 12 are also transmitted into the body by way of the false spar 19 by reason of the rigid anchorage of spars 30 (with which shear ribs 33 connect) to the false spar 19 through lugs 31, 32.

In this manner there has been achieved the empennage construction and anchorage of the invention. That it may be achieved in other ways without departing from the generic spirit of the invention is almost the foregoing conclusion, so generally is it possible to achieve the objects of an invention by two or more specific means. Each such achievement which falls within the generic spirit of the invention it is intended herebelow to claim, irrespective of the superficial limitations of terminology.

What is claimed is:

1. In an empennage construction and mounting, a stabilizer surface embodying a main spar substantially of the transverse extent of the surface having an intermediate portion overlying a portion of the body of the aircraft, a relatively short false spar also embodied in said stabilizer surface and also overlying the same portion of the body of the aircraft but not substantially greater in length than the length required for such overlying, a shear rib interconnecting the inner portion of the main spar and the outer portion of the false spar and adapted to transmit in shear the stresses from said main spar to said false spar, and rigid connections anchoring the body-overlying portion of said false spar to the body.

2. An empennage construction and mounting according to claim 1 in which the main spar is the front spar of a stabilizer construction embodying front and rear spars and the rear spar is rearwardly removed from the false spar but likewise provided with a body-overlying portion and connected with the false spar through a shear rib, together with a rigid connection between the said body-overlying portion of the rear spar and the body.

3. An empennage construction and mounting acording to claim 1 in which the stabilizer surface embodies front and rear spars one of which is the main spar as in claim 1 defined and the other of which is similarly provided with a body-overlying portion and a shear rib connection with the false spar, and like the false spar is rigidly connected through its body-overlying portions with the body, the said false spar lying between the front and rear spars.

4. An empennage construction and mounting according to claim 1 in which the said main spar in its portion overlying the body is provided with a compound connection thereto comprised of an inner part relatively rigid in shear and an outer part relatively flexible whereby to by-pass stresses into the body by way of the shear rib.

5. An empennage construction and mounting according to claim 1 in which the rigid body connections of the false spar are laterally spaced such connections.

6. An empennage construction and mounting according to claim 1 in which the stabilizing surface is an horizontal stabilizer surface but there is provided also a vertical stabilizing surface on its part having anchorage to the body by way of said false spar in its body-overlying portion.

7. A horizontal stabilizer having a central portion for disposition over and attachment to a portion of an aircraft body and embodying a through-running rear main spar extending substantially from end to end thereof, nose-forming spars extending from said central portion substantially to the ends thereof, rib elements interconnecting said rear spar with said nose-forming spars, skin blankets covering said spars and ribs, a false spar at said central portion between said blankets and intermediate the nose-forming spars and said rear spar, said rear spar and said false spar each having body attaching elements at said central portion, and a pair of span-wise spaced shear ribs disposed outwardly span-wise of said attaching elements and interconnecting the inboard ends of said nose-forming spars with said false spar and with said rear spar for transmitting shear stresses from said nose-forming spars to said false spar.

8. In a horizontal stabilizer having a central portion for disposition over and attachment to a portion of an aircraft body, nose-forming spars extending in opposite directions outwardly from said central portion, and a rear spar spaced rearwardly from said nose-forming spars, means for transmitting shear stresses from said nose-forming spars to said central portion comprising span-wise-spaced rigid shear ribs interconnecting the inboard ends of said nose-forming spars with said rear spar, and a rigid false spar at said central portion and intermediate said nose-forming spars and said rear spar rigidly interconnected with said shear ribs, said false spar and the central portion of the rear spar each having rigid body anchoring elements.

9. In an aircraft construction in combination, a body having an interior framework, a through-running airfoil having an interior framework extending across said body, said framework including front and rear spars and an intermediate false spar connected to the front and rear spars by shear ribs, a superposed airfoil structure disposed adjacent the through-running airfoil on the side opposite the body, tie members secured interiorly to the body and through-running airfoil framework and extending between them to connect them together, and tie members secured interiorly to the through-running and superposed airfoil framework and extending from the through-running airfoil into the superposed airfoil to connect them together.

10. In an aircraft construction in combination, a body having an interior framework, a through-running airfoil having an interior framework including spars extending across said body, said framework including front and rear spars and an intermediate false spar connected to the front and rear spars by shear ribs, a superposed airfoil structure disposed adjacent the through-running airfoil on the side opposite the body, tie members secured interiorly to the airfoil spars and the body framework and extending between them to tie them together, and tie members secured interiorly to the airfoil spars and the superposed airfoil framework and extending from the through-running airfoil to connect them together.

MICHAEL WATTER.